United States Patent
Tanaka et al.

(10) Patent No.: US 11,667,559 B2
(45) Date of Patent: Jun. 6, 2023

(54) METHOD FOR MANUFACTURING OPTICAL FIBER PARENT MATERIAL, AND METHOD FOR MANUFACTURING OPTICAL FIBER

(71) Applicant: SUMITOMO ELECTRIC INDUSTRIES, LTD., Osaka (JP)

(72) Inventors: Satoshi Tanaka, Osaka (JP); Tetsuya Haruna, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/641,778

(22) PCT Filed: Aug. 28, 2018

(86) PCT No.: PCT/JP2018/031770
§ 371 (c)(1),
(2) Date: Feb. 25, 2020

(87) PCT Pub. No.: WO2019/044833
PCT Pub. Date: Mar. 7, 2019

(65) Prior Publication Data
US 2020/0247710 A1    Aug. 6, 2020

(30) Foreign Application Priority Data
Aug. 31, 2017    (JP) .............................. JP2017-167406

(51) Int. Cl.
*C03B 37/012*    (2006.01)
*C03B 37/018*    (2006.01)
(Continued)

(52) U.S. Cl.
CPC .. *C03B 37/01869* (2013.01); *C03B 37/01205* (2013.01); *C03B 37/025* (2013.01);
(Continued)

(58) Field of Classification Search
CPC ............ C03B 37/01815; C03B 37/014–01892
See application file for complete search history.

(56) References Cited

U.S. PATENT DOCUMENTS

2002/0181885 A1    12/2002    Suzuki et al.
2004/0057692 A1*    3/2004    Ball .................. C03B 37/01892
                                                                385/142
(Continued)

FOREIGN PATENT DOCUMENTS

EP        2484644 A1    8/2012
GB        1555562 A  *  11/1979  ........... C03B 37/018
(Continued)

*Primary Examiner* — Erin Snelting
(74) *Attorney, Agent, or Firm* — Faegre Drinker Biddle & Reath LLP (57) ABSTRACT

A method for manufacturing an optical fiber preform including a core part and a cladding part is disclosed. The method includes: adding an alkali metal to an inner surface of a silica-based glass pipe; etching the inner surface of the silica-based glass pipe to which the alkali metal is added; making a glass rod by collapsing the silica-based glass pipe after the etching; and making an optical fiber preform using the glass rod. The silica-based glass pipe is heated in the adding such that a surface temperature of the silica-based glass pipe falls within a temperature range of 1500° C. or higher to lower than 2000° C.

9 Claims, 6 Drawing Sheets (51) Int. Cl.
*C03B 37/027* (2006.01)
*C03C 25/68* (2006.01)
*C03B 37/025* (2006.01)

(52) U.S. Cl.
CPC ............ *C03B 37/027* (2013.01); *C03C 25/68* (2013.01); *C03B 2201/50* (2013.01)

(56) References Cited

U.S. PATENT DOCUMENTS

| | | | |
|---|---|---|---|
| 2005/0063663 A1* | 3/2005 | Anderson | C03B 37/01211 385/142 |
| 2007/0283721 A1 | 12/2007 | Nakanishi et al. | |
| 2007/0297735 A1* | 12/2007 | Khrapko | C03B 37/01446 385/127 |
| 2008/0050086 A1* | 2/2008 | Bickham | G02B 6/0281 385/142 |
| 2011/0314874 A1 | 12/2011 | Kitamura | |
| 2012/0189262 A1* | 7/2012 | Hirano | C03B 37/01807 385/142 |
| 2012/0198891 A1* | 8/2012 | Tamura | C03B 37/01228 65/397 |
| 2014/0370287 A1 | 12/2014 | Tamura et al. | |
| 2015/0299022 A1 | 10/2015 | Hirano et al. | |
| 2017/0137316 A1 | 5/2017 | Aiso et al. | |

FOREIGN PATENT DOCUMENTS

| | | |
|---|---|---|
| JP | H7-196326 A | 8/1995 |
| JP | 2002-365469 A | 12/2002 |
| JP | 2004-295010 A | 10/2004 |
| JP | 2005-537210 A | 12/2005 |
| JP | 2006-124240 A | 5/2006 |
| JP | 2007-504080 A | 3/2007 |
| JP | 2009-541796 A | 11/2009 |
| JP | 2012-006779 A | 1/2012 |
| JP | 2014-214079 A | 11/2014 |
| JP | 2015-105199 A | 6/2015 |
| JP | 2016-037412 A | 3/2016 |
| WO | WO-2004/020357 A2 | 3/2004 |
| WO | WO-2005/021455 A2 | 3/2005 |
| WO | WO-2007/149344 A1 | 12/2007 |
| WO | WO 2008/024255 A2 | 2/2008 |
| WO | WO-2013/111470 A1 | 8/2013 |
| WO | WO-2013/118389 A1 | 8/2013 |

* cited by examiner

METHOD FOR MANUFACTURING OPTICAL FIBER PARENT MATERIAL, AND METHOD FOR MANUFACTURING OPTICAL FIBER

TECHNICAL FIELD

The present disclosure relates to a method for manufacturing an optical fiber preform and a method for manufacturing an optical fiber. The present application claims priority based on Japanese Patent Application No. 2017-167406, filed on Aug. 31, 2017, the entire contents disclosed in the application are incorporated herein by reference.

BACKGROUND ART

Patent Literature 1 and Patent Literature 2 disclose a method for manufacturing an optical fiber preform by adding an alkali metal to an optical fiber preform whereby attenuation of an optical fiber manufactured from the preform can be reduced. In the method for manufacturing an optical fiber preform described in Patent Literature 1, an alkali metal such as potassium is added to an inner surface of a silica-based glass pipe, and thereafter etching of the inner surface and a collapsing process are performed to manufacture an optical fiber preform.

CITATION LIST

Patent Literature

Patent Literature 1: Japanese Unexamined Patent Publication No. JP2014-214079
Patent Literature 2: Japanese Unexamined Patent Publication No. JP2005-537210

SUMMARY OF INVENTION

The present disclosure provides a method for manufacturing an optical fiber preform including a core part and a cladding part. The method includes: adding an alkali metal to an inner surface of a silica-based glass pipe; etching the inner surface of the silica-based glass pipe to which the alkali metal is added; making a glass rod by collapsing the silica-based glass pipe after the etching; and making an optical fiber preform using the glass rod. The silica-based glass pipe is heated in the adding of the alkali metal such that a surface temperature of the silica-based glass pipe falls within a temperature range of 1500° C. or higher to lower than 2000° C.

The present disclosure provides a method for manufacturing an optical fiber. This method is a method for manufacturing an optical fiber using an optical fiber preform manufactured by the above method for manufacturing an optical fiber preform. The method for manufacturing an optical fiber further includes drawing the optical fiber preform to manufacture an optical fiber.

DESCRIPTION OF EMBODIMENTS

Problem to be Solved by the Present Disclosure

When an alkali metal is added to a silica-based glass pipe for an optical fiber preform, the added alkali metal may cause transition of glass to a crystalline structure. In the method for manufacturing an optical fiber preform described in Patent Literature 1, an outer surface of a silica-based glass pipe is heated by an oxyhydrogen burner to 2000° C. or higher when an alkali metal is added to the silica-based glass pipe. This prevents devitrification of glass due to the crystalline structure. When the heating temperature for the silica-based glass pipe is high, the crystallization of glass can be suppressed but the silica-based glass pipe may be softened and become deformed or non-circular. It is therefore desired that while devitrification of the glass pipe for an optical fiber preform is suppressed, its deformation is also suppressed.

Advantageous Effects of the Present Disclosure

According to the present disclosure, while devitrification of the glass pipe used for an optical fiber preform is suppressed, the deformation of the glass pipe also can be suppressed.

DESCRIPTION OF EMBODIMENTS OF THE PRESENT DISCLOSURE

Embodiments of the present disclosure will be described. A method for manufacturing an optical fiber preform according to an embodiment of the present disclosure is a method for manufacturing an optical fiber preform including a core part and a cladding part. The method includes: adding an alkali metal to an inner surface of a silica-based glass pipe; etching the inner surface of the silica-based glass pipe to which the alkali metal is added; making a glass rod by collapsing the silica-based glass pipe after the etching; and making an optical fiber preform using the glass rod. The silica-based glass pipe is heated in the adding such that the surface temperature of the silica-based glass pipe falls within a temperature range of 1500° C. or higher to lower than 2000° C.

In this method for manufacturing an optical fiber preform, when an alkali metal is added to the glass pipe, the silica-based glass pipe is heated by adjusting the surface temperature of the silica-based glass pipe within a temperature range of 1500° C. or higher to lower than 2000° C. In this case, according to the study by the inventors of the present invention, it was confirmed that the glass pipe with the addition of an alkali metal is not devitrified and deformation of the glass pipe is suppressed. Thus, the surface temperature of the glass pipe is adjusted in a temperature range of 1500° C. or higher to lower than 2000° C. when an alkali metal is added, whereby devitrification of the glass pipe used for an optical fiber preform is suppressed and its deformation also can be suppressed, resulting in an optical fiber preform for manufacturing an optical fiber with low attenuation.

In one aspect of the present embodiment, in the adding, the heating time per traverse with which the surface temperature of a predetermined area of the silica-based glass pipe falls within a temperature range of 1500° C. or higher to lower than 2000° C. may be 0.5 minute or longer and shorter than 40 minutes. In the adding, the heating time per traverse with which the surface temperature of the predetermined area of the silica-based glass pipe falls within a temperature range of 1500° C. or higher to lower than 2000° C. may be 1 minute or longer or may be shorter than 40 minutes. In this case, while devitrification of the glass pipe used for an optical fiber preform is suppressed, deformation or becoming non-circular of the glass pipe can be further suppressed. As used herein, "per traverse" refers to one traverse movement in one direction (single path).

In one aspect of the present embodiment, in the adding, the silica-based glass pipe may be heated by a heating burner such that the surface temperature of the silica-based glass pipe falls within a temperature range of 1500° C. or higher to lower than 2000° C., and the width that achieves a temperature zone of 1500° C. or higher in the heating temperature profile of the heating burner may be kept to be not more than six times an outer diameter of the silica-based glass pipe. In this case, the silica-based glass pipe is heated more locally, so that the addition of an alkali metal to the glass pipe can be performed while deformation of the glass pipe due to the spread of the heating area is further suppressed.

In one aspect of the present embodiment, in the adding, the silica-based glass pipe may be heated such that the surface temperature of the silica-based glass pipe falls within a temperature range of 1500° C. or higher to lower than 1800° C.

In one aspect of the present embodiment, in the adding, a space in which the silica-based glass pipe is held may be kept at a positive pressure, and the internal pressure in the space may be greater than 0 Pa and 20 Pa or less. In this case, deformation of the glass pipe by heating can be further suppressed.

In one aspect of the present embodiment, the alkali metal added in the adding may be potassium, and the silica-based glass pipe may be repeatedly heated in the adding such that the ratio d2/d1 in the optical fiber preform is 1.5 or more and less than 3.0, where d1 is the diameter of an area in which the potassium concentration in the optical fiber preform is 50 [atomic ppm] or more, and d2 is the diameter of an area in which the potassium concentration in the optical fiber preform is 50 [atomic ppm] or less and the chlorine concentration is 1000 [atomic ppm] or less. In this case, crystallization of glass can be suppressed while the potassium-added area that can reduce attenuation of the optical fiber is increased.

In another aspect, the present embodiment relates to a method for manufacturing an optical fiber. The method is a method for manufacturing an optical fiber using an optical fiber preform manufactured by the method for manufacturing an optical fiber preform according to any one or a combination of the aspects described above. The method for manufacturing an optical fiber further includes drawing the optical fiber preform to manufacture an optical fiber. In this case, since an optical fiber is manufactured using the glass rod made from the glass pipe in which devitrification and deformation are suppressed, an optical fiber with lower loss can be obtained.

Detail of Embodiment of the Present Disclosure

Specific examples of the method for manufacturing an optical fiber preform according to an embodiment of the present disclosure and the method for manufacturing an optical fiber using the optical fiber preform manufactured by this method will be described below with reference to the drawings. The present invention is not limited by such examples but shown by the claims, and it is intended that all modifications within the meaning and scope of equivalents to the claims are embraced therein. In the following description, the same elements in a description of the drawings are denoted by the same reference signs and an overlapping description will be omitted.

Figure 1:
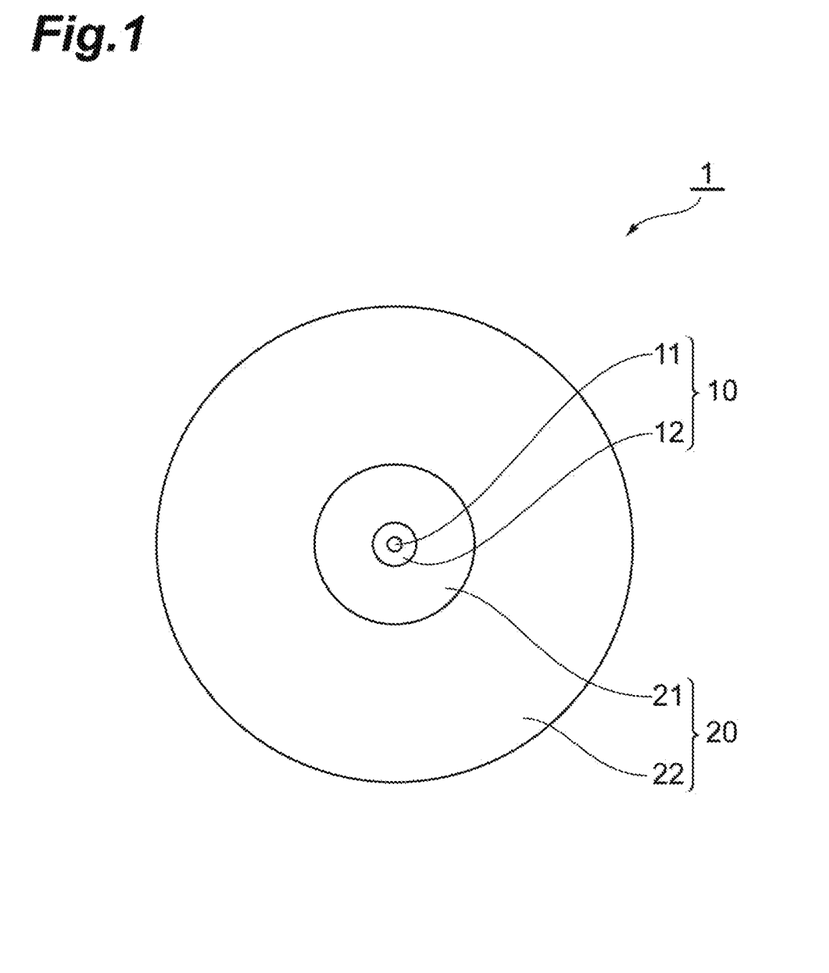
FIG. 1 is a cross-sectional view of an optical fiber preform according to an embodiment.

FIG. 1 is a cross-sectional view of an optical fiber preform manufactured by the method for manufacturing an optical fiber preform according to the present embodiment. An optical fiber preform 1 is formed of a silica-based glass and includes a core part 10 and a cladding part 20 surrounding the core part 10. The refractive index of the core part 10 is higher than the refractive index of the cladding part 20. The core part 10 has a first core part 11 and a second core part 12 surrounding the first core part 11. The cladding part 20 has a first cladding part 21 surrounding the core part 10 and a second cladding part 22 surrounding the first cladding part 21. An alkali metal (for example, potassium) is added to the first core part 11 by the manufacturing method described later.

Figure 2:
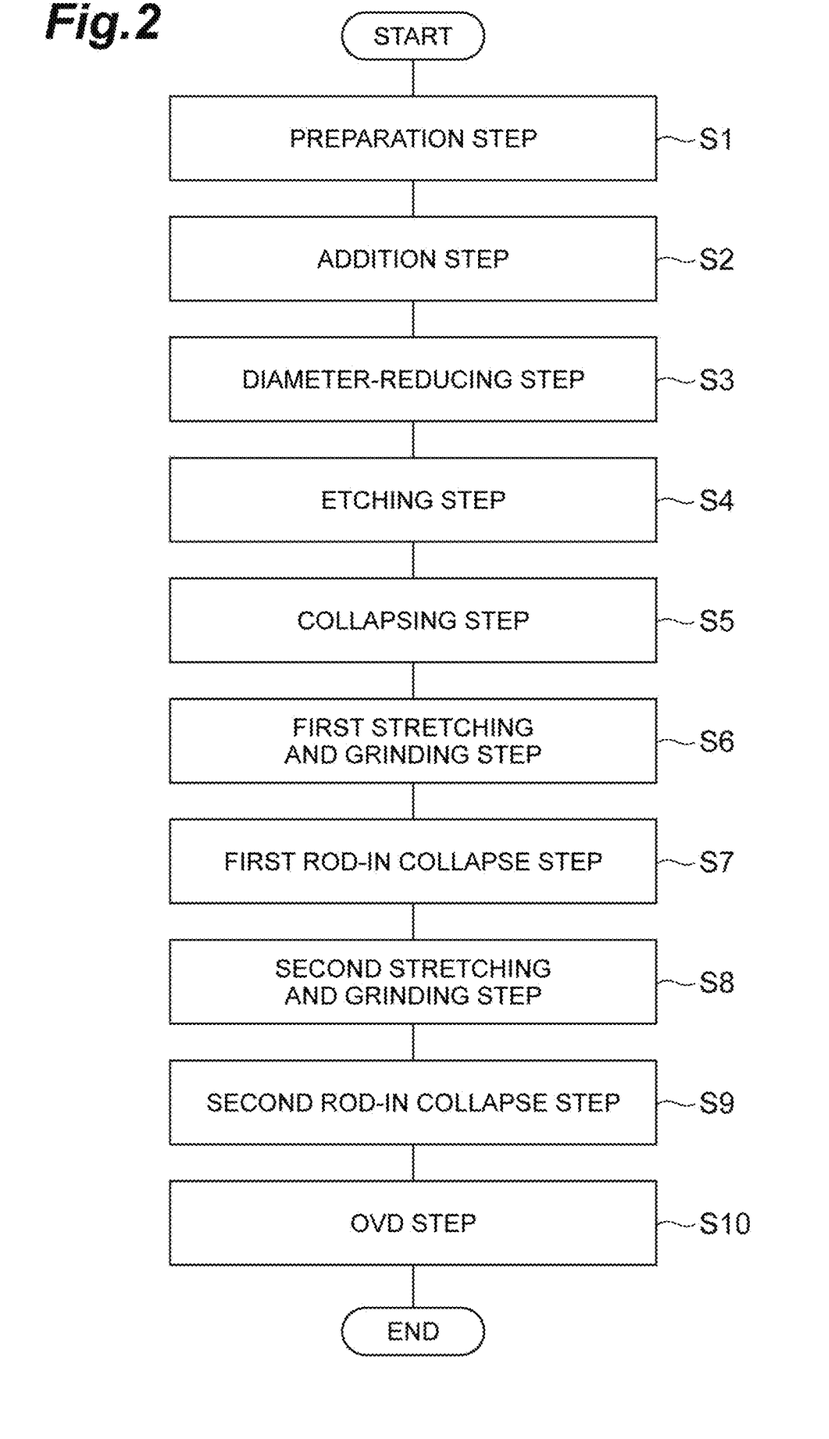
FIG. 2 is a flowchart of a method for manufacturing an optical fiber preform according to an embodiment.
Figure 3:
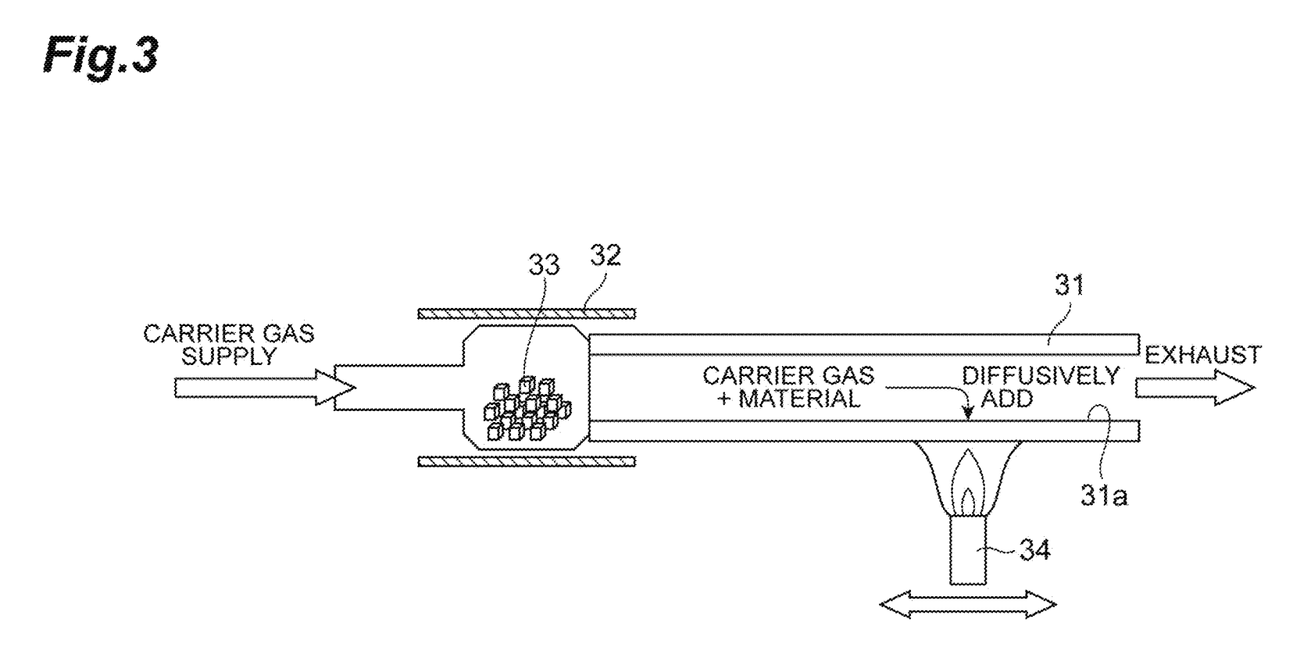
FIG. 3 is a schematic diagram illustrating an overview of an addition step S2 in the method for manufacturing an optical fiber preform.

FIG. 2 is a flowchart for explaining the method for manufacturing an optical fiber preform according to the present embodiment. In the method for manufacturing an optical fiber preform, as illustrated in FIG. 2, a preparation step S1, an addition step S2, a diameter-reducing step S3, an etching step S4, a collapsing step S5, a first stretching and grinding step S6, a first rod-in collapse step S7, a second stretching and grinding step S8, a second rod-in collapse step S9, and an OVD step S10 are performed in order, to manufacture the optical fiber preform 1 illustrated in FIG. 1. FIG. 3 is a schematic diagram illustrating the process in the addition step S2 in the method for manufacturing an optical fiber preform.

In the preparation step S1, a silica-based glass pipe 31 (see FIG. 3) into which an alkali metal element is to be diffused is first prepared. The silica-based glass pipe 31 is a pipe that contains, for example, a predetermined amount of chlorine (Cl) and fluorine (F) and in which the concentrations of other dopants and impurities are kept to a predetermined amount or lower. The silica-based glass pipe 31, for example, has an outer diameter of 35 mm and an inner diameter of 20 mm.

Subsequently, in the addition step S2, an alkali metal is added to the inner peripheral surface of the silica-based glass pipe 31. For example, potassium (K), sodium (Na), rubidium (Rb), or cesium (Cs) can be used as the alkali metal added in the addition step. For example, when potassium bromide (KBr) is used as alkali metal material 33, as illustrated in FIG. 3, potassium bromide is heated by an external heat source 32 to generate KBr vapor. Then, while KBr vapor is introduced together with the supplied carrier gas to the inner peripheral of the silica-based glass pipe 31, the outer surface of the silica-based glass pipe 31 is heated by a heating burner 34. In this heating process, the heating burner 34 is reciprocatively traversed multiple times (for example 10 turns) in the direction of the arrow in the drawing at a predetermined speed (for example 40 mm/min) to diffusively add the potassium metal into an inner surface 31a of the silica-based glass pipe 31. In this case, for example, when KBr vapor is introduced to the inside of the silica-based glass pipe 31 together with a carrier gas in which oxygen is introduced at a flow rate of 1 SLM (1 liter/min in terms of a normal condition), the maximum value of potassium concentration of the silica-based glass pipe 31 to which the alkali metal is added can be set to 1000 [atomic ppm].

Figure 4:
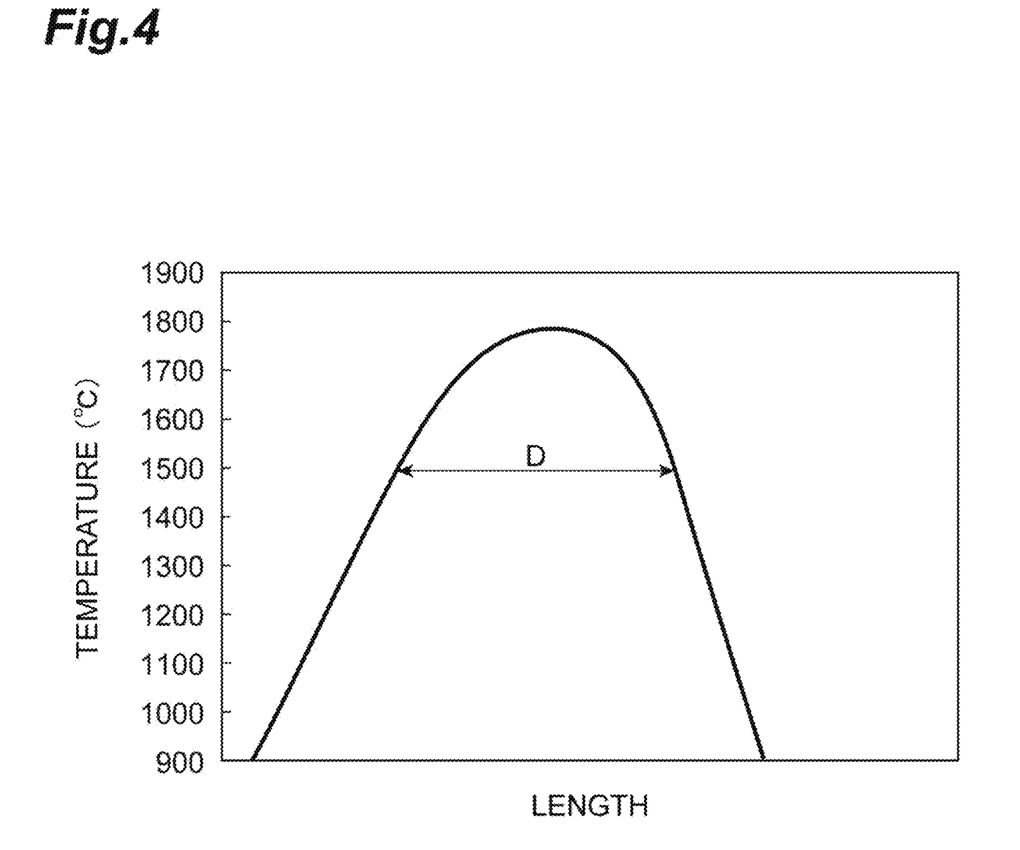
FIG. 4 is a graph illustrating an example of the temperature profile of a heating burner used in the addition step S2 in the method for manufacturing an optical fiber preform.

In the heating process by the heating burner 34 in the addition step in the present embodiment, heating is performed by adjusting the heating burner 34 such that the surface temperature of the glass pipe 31 is 1500° C. or higher and lower than 2000° C., preferably, 1500° C. or higher and 1800° C. or lower. In other words, the heating process is performed such that the surface temperature of the glass pipe 31 does not exceed 2000° C. The heating burner 34 has a preset prescribed temperature profile (see FIG. 4) and is adjusted such that the width D in which the heating temperature is 1500° C. or higher is not increased. In the heating burner 34, for example, the width D in the temperature profile is kept to be not more than six times the diameter of the glass pipe 31 heated. In the addition step, in addition to limiting the range of heating temperature, heating is performed by adjusting the traverse speed of the heating burner 34 such that the heating time (burner heating time) in each area of the glass pipe 31 by the heating burner 34 is within a predetermined range of 0.5 minute to 40 minutes, preferably, 1 minute or longer and shorter than 20 minutes. That is, the traverse speed is adjusted such that the heating time per traverse with which the surface temperature of a certain area of the silica-based glass pipe 31 falls within a temperature range of 1500° C. or higher to lower than 2000° C. is 0.5 minute to 40 minutes, preferably, 1 minute or longer and shorter than 20 minutes. As used herein, "per traverse" refers to one traverse movement in one direction (single path).

In the addition step in the present embodiment, the heating temperature and the heating time by the heating burner 34 are adjusted to a predetermined range, and then an alkali metal is diffusively added to the inner surface 31a of the silica-based glass pipe 31. The adjustment of heating in this manner suppresses devitrification due to crystallization and thermal deformation of the glass pipe 31. For example, an oxyhydrogen burner can be used as the heating burner 34. The addition step may be performed in an environment in which a space in which the silica-based glass pipe 31 is held is kept at a positive pressure and the internal pressure of the space is greater than 0 Pa and 20 Pa or less.

Subsequently, in the diameter-reducing step S3, after the supply of an alkali metal such as KBr vapor used in the addition step S2 is stopped, the diameter of the silica-based glass pipe 31 to which the alkali metal is added is reduced. In doing so, while oxygen (for example, a flow rate of 0.5 SLM) is introduced to the inside of the silica-based glass pipe 31, the silica-based glass pipe 31 is heated by an external heat source such that the outer surface of the silica-based glass pipe 31 attains 1600° C. to 2100° C. Heating is performed by traversing the heating burner 34, for example, about 6 turns, and the diameter of the silica-based glass pipe 31 to which the alkali metal is added is reduced until the inner diameter attains 5 mm.

Subsequently, in the etching step S4, the inner peripheral surface of the silica-based glass pipe having its diameter reduced is etched. In the etching step, while a gas mixture of $SF_6$ (for example, a flow rate of 0.2 SLM) and chlorine (for example, a flow rate of 0.5 SLM) is introduced to the inside of the silica-based glass pipe having its diameter reduced, the silica-based glass pipe is heated by an external heat source to perform a vapor phase etching of the inner peripheral surface. In this process, the inner peripheral surface of the glass pipe is etched at a thickness of about 400 to 800 μm to remove the pipe inner surface containing a high concentration of impurities added together with the alkali metal in the addition step. The impurities are thus removed from the glass pipe.

Subsequently, in the collapsing step S5, the silica-based glass pipe having its diameter reduced and having the etched inner peripheral surface is collapsed. In the collapsing step, the silica-based glass pipe is collapsed by reducing the absolute pressure inside the silica-based glass pipe to 97 kPa or lower while introducing a gas mixture of oxygen (for example, a flow rate of 0.1 SLM) and helium (for example, a flow rate of 1 SLM) to the inside of the silica-based glass pipe, and bringing the surface temperature of the silica-based glass pipe to 1600° C. to 2100° C. using an external heat source. This collapsing step results in a first glass rod (for example, an outer diameter of 25 mm) of a transparent silica-based glass containing an alkali metal. The alkali metal is diffusively added in the first glass rod.

Figure 5:
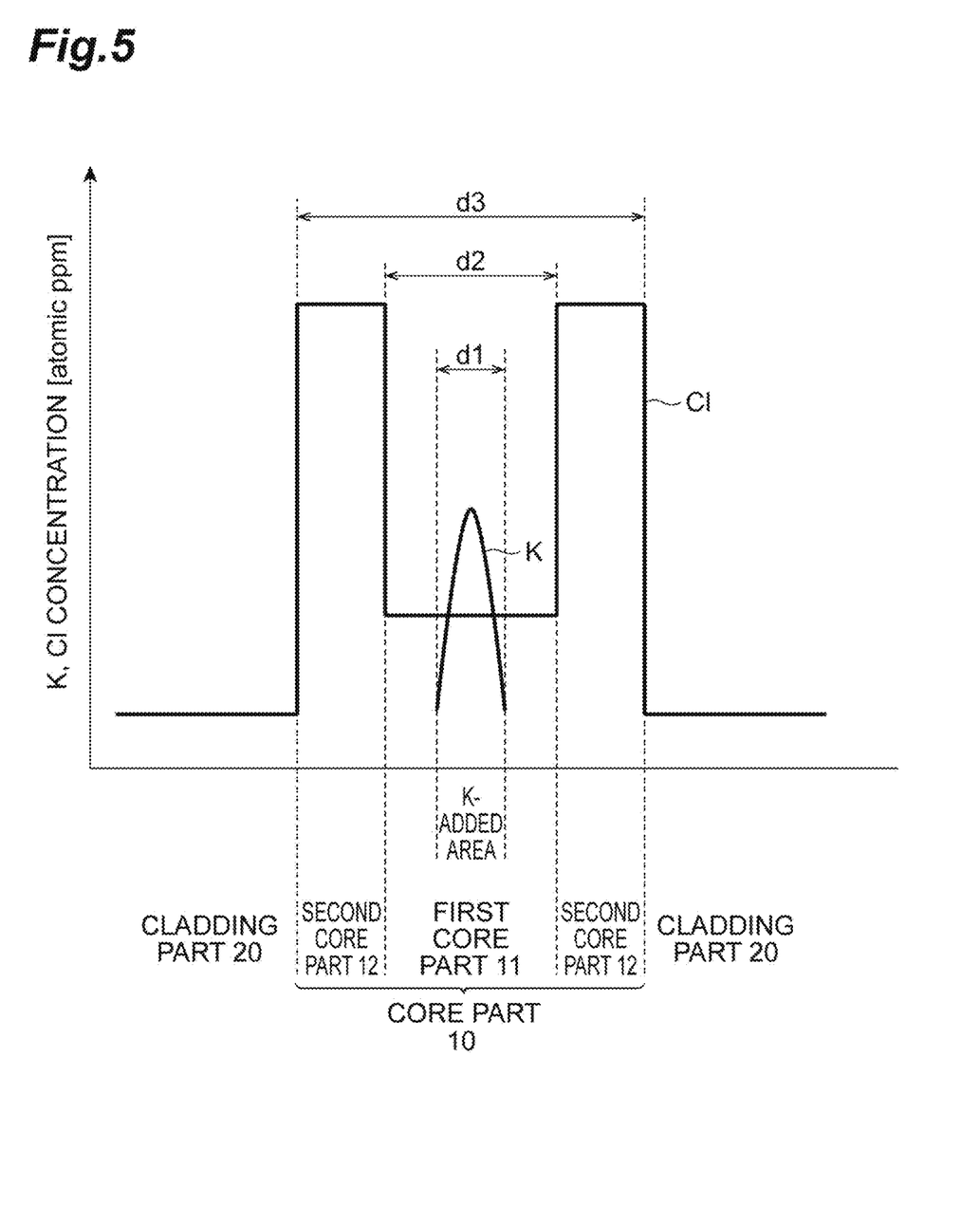
FIG. 5 is a graph illustrating a K concentration distribution and a Cl concentration distribution in the radial direction in the optical fiber preform illustrated in FIG. 1.

Subsequently, in the first stretching and grinding step S6, the first glass rod obtained by collapsing is stretched, for example, to a diameter of 20 mm, and the outer peripheral portion is further ground to a diameter of 12 mm, resulting in the first core part 11. In doing so, as illustrated in FIG. 5, when the diameter in which the K concentration is 50 [atomic ppm] or more is d1, and the outer diameter in which the K concentration is 50 [atomic ppm] or less and the Cl concentration is 1000 [atomic ppm] or less is d2, the ratio of d2/d1 in the first core part 11 can be set between 1.5 or more and less than 3.0.

Subsequently, in the first rod-in collapse step S7, the second core part 12 is provided on the outside of the first core part 11, resulting in a second glass rod. In step S7, the second glass rod is manufactured by a rod-in collapse method in which the first core part 11 is inserted to the inside of a silica-based glass pipe (second core part 12) having an outer diameter of 55 mm and in which a predetermined amount of chlorine atoms is added, and they are heated to be integrated by an external heat source.

Subsequently, in the second stretching and grinding step S8, the second glass rod is stretched to a diameter of 24 mm, and the outer peripheral portion is further ground to a diameter of 17 mm. A combination of the first core part 11 and the second core part 12 is the core part 10. When the diameter of the core part 10 is d3, the ratio of d3/d1 in the core part 10 can be set to 4 to 8.

Subsequently, in the second rod-in collapse step S9, the first cladding part 21 is provided on the core part 10. In this step, a rod-in collapse method is used in which the core part 10 is inserted to the inside of a silica-based glass pipe (corresponding to the first cladding part 21) in which a predetermined amount of fluoride is added, and they are heated to be integrated by an external heat source. The relative ratio refractive index difference between the second core part 12 and the first cladding part 21 is, for example, at most about 0.34%. As a result of the synthesis by this rod-in collapse method, the moisture in the core part 10 and the neighboring first cladding part 21 can be suppressed to be sufficiently low.

Subsequently, in the OVD step S10, the glass rod formed by integrating the core part 10 and the first cladding part 21 is stretched to a predetermined diameter, and thereafter the second cladding part 22 containing fluoride is synthesized on the outside of the glass rod by the OVD method to manufacture the optical fiber preform 1. In the resultant optical fiber preform 1, for example, the outer diameter of the first cladding part 21 is 36 mm, and the outer diameter of the second cladding part 22 is 140 mm. The relative ratio refractive index difference between the second core part 12 and the second cladding part 22 is at most about 0.32%. The concentration of OH group on the outside of the first cladding part 21 can be measured using infrared absorption spectroscopy and is about 400 [mol ppm].

In the subsequent drawing step, the optical fiber preform 1 manufactured by the manufacturing method as described above is drawn to obtain an optical fiber. The drawing speed is, for example, 2300 m/min, and the drawing tension can be 0.5 N. As described above, an optical fiber with low attenuation by addition of an alkali metal, and an optical fiber preform for the optical fiber can be manufactured.

The degree of crystallization (devitrification) and deformation (becoming non-circular) of the optical fiber preform manufactured by the manufacturing method described above will now be described. As described above, in the method for manufacturing an optical fiber preform according to the present embodiment, in the addition step S2 of adding an alkali metal, the heating temperature in adding an alkali metal such as potassium to the silica-based glass pipe 31 is adjusted to fall within a range of 1500° C. or higher to lower than 2000° C. That is, the heating process is adjusted such that the surface temperature of the silica-based glass pipe 31 quickly reaches 1500° C. and does not exceed 2000° C. In this way, the glass temperature of the surface of the silica-based glass pipe is adjusted not to low temperatures (1200° C. or higher to lower than 1500° C.) but to high temperatures (1500° C. or higher), so that formation or growth of crystalline nuclei of silica ($SiO_2$) forming the glass pipe is not promoted, thereby preventing the crystalline structure from being kept. With such adjustment, even when glass is easily crystallized due to the alkali metal added to reduce the attenuation of the optical fiber, devitrification of the silica-based glass pipe used for manufacturing an optical fiber preform can be suppressed.

Diffusion and penetration of an alkali metal in the glass proceed by keeping a high surface temperature of the glass pipe to which the alkali metal is added. However, it has been found that when the glass heating temperature is further higher (2000° C. or higher), the fiber preform itself is deformed or becomes non-circular due to heat. Then, in the present embodiment, the upper limit of the heating temperature in the addition step is defined to lower than 2000° C. This can suppress heating of the glass pipe to a certain degree when an alkali metal is added to the silica-based glass pipe and can also suppress deformation or becoming non-circular of the optical fiber preform. The glass heating temperature is adjusted to lower than 2000° C. as in the method for manufacturing an optical fiber preform according to the present embodiment, whereby deformation or becoming non-circular of the optical fiber preform can be suppressed, and an optical fiber manufactured using such an optical fiber preform achieves low attenuation.

In the method for manufacturing an optical fiber preform according to the present embodiment, in the addition step, the heating time per traverse with which the surface temperature of a predetermined area of the silica-based glass pipe 31 falls within a temperature range of 1500° C. or higher to lower than 2000° C. can be set to 1 minute or longer to shorter than 20 minutes. In this case, while devitrification of the glass pipe for an optical fiber preform is suppressed, deformation or becoming non-circular of the glass pipe can be further suppressed.

In the method for manufacturing an optical fiber preform according to the present embodiment, in the addition step, the silica-based glass pipe 31 may be heated by the heating burner 34 such that the surface temperature of the silica-based glass pipe 31 falls within a temperature range of 1500° C. or higher to lower than 2000° C., and the width D that achieves a temperature zone of 1500° C. or higher in the heating temperature profile (see FIG. 4) of the heating burner 34 may be kept to be not more than six times the diameter of the silica-based glass pipe 31. In this case, the silica-based glass pipe 31 is heated more locally, so that the addition of an alkali metal to the glass pipe can be performed while deformation of the glass pipe due to the spread of heating is further suppressed.

In the method for manufacturing an optical fiber preform according to the present embodiment, in the addition step, an space in which the silica-based glass pipe 31 is held may be kept at a positive pressure, and the internal pressure of the space may be greater than 0 Pa and 20 Pa or less. In such a pressure state, the deformation of the glass pipe by heating can be further suppressed.

An optical fiber preform was manufactured based on the manufacturing method described above, and the presence/absence of devitrification of the glass pipe and the presence/absence of deformation of the glass pipe were evaluated. The prepared silica-based glass pipe had an outer diameter of 35 mm and an inner diameter of 20 mm. Potassium bromide (KBr) as an alkali metal for adding to the glass pipe was heated by an external heat source to 840° C. to generate KBr vapor. Then, while KBr vapor was introduced into the silica-based glass pipe 31 together with a carrier gas in which oxygen was introduced at a flow rate of 1 SLM, heating was performed from the outside by an oxyhydrogen burner (heating burner 34) traversing such that the surface of the silica-based glass pipe 31 reached a range of 1500° C. or higher to 1800° C. or lower. The heating time by the oxyhydrogen burner (burner heating time) is a value obtained by dividing the burner heating range by a traverse speed and means a heating time during which a certain point (area) in the glass pipe is heated to 1500° C. or higher. The temperature profile (see FIG. 4) of the burner was set such that the heating range (the width D illustrated in FIG. 4) by the oxyhydrogen burner was 165 mm (the range of temperatures of 1500° C. or higher). The number of turns (the number of reciprocations) of traverse by the oxyhydrogen burner is set to 10.

Then, as illustrated below, the presence/absence of devitrification and the presence/absence of deformation of the glass pipe were evaluated by adjusting the traverse speed of the oxyhydrogen burner to change the burner heating time stepwise from 0.5 minute to 40 minutes. The evaluation result is illustrated in Table 1 below.

TABLE 1

| Burner heating time (minute) | Presence/absence of devitrification | Presence/absence of deformation |
|---|---|---|
| 0.5 | B | A |
| 1 | A | A |
| 2 | A | A |
| 4 | A | A |
| 8 | A | A |
| 12 | A | A |
| 16 | A | A |
| 20 | A | B |
| 40 | A | B |

In the presence/absence of devitrification in Table 1, "A" indicates a state in which no devitrification occurs and "B" indicates a state in which devitrification partially occurs. "A" in the presence/absence of deformation indicates a state in which the deformation of the glass pipe (an effective length of 100 mm) is 2 mm or less, and "B" in the presence/absence of deformation indicates a state in which the deformation of the glass pipe is 2 mm or more and 5 mm or less.

As is clear from Example above, it was confirmed that the surface temperature of the glass pipe is set to 1500° C. or higher to lower than 2000° C. when an alkali metal is added to the glass pipe, whereby devitrification due to crystallization of the glass pipe can be suppressed and deformation due to heating of the glass pipe can be suppressed. In addition, the time during which the surface temperature of the glass pipe is set to 1500° C. or higher to lower than 2000° C. is set to 0.5 minute or longer and 40 minutes or shorter, more preferably, 1 minute or longer and shorter than 20 minutes when an alkali metal is added to the glass pipe, whereby thermal deformation of the optical fiber preform can be further suppressed.

Figure 6A:
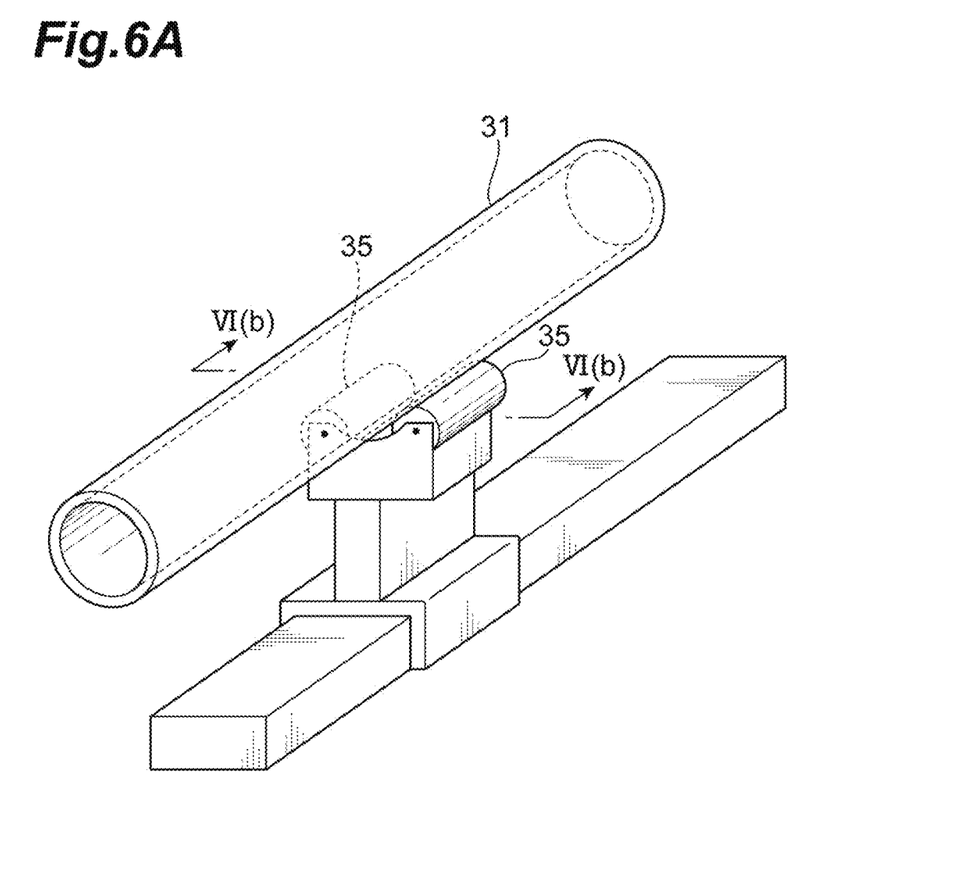
FIG. 6A is a diagram illustrating a support member used in the addition step S2 in the method for manufacturing an optical fiber preform.
Figure 6B:
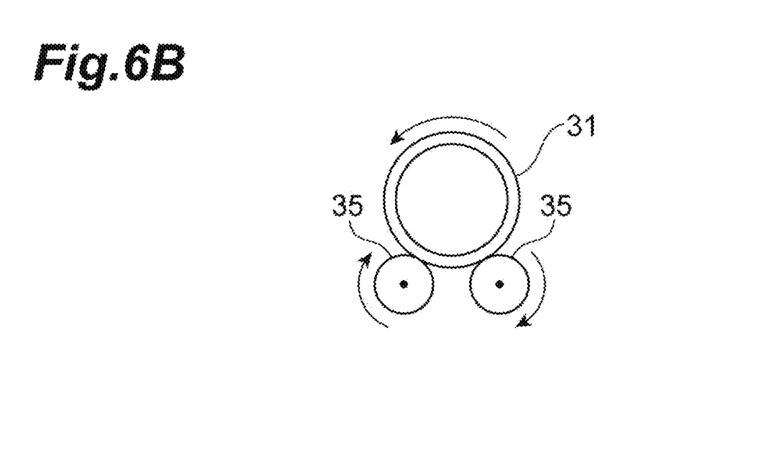
FIG. 6B is a partial cross-sectional view of the support member taken along line VI(b)-VI(b) illustrated in FIG. 6A.

A method for manufacturing an optical fiber preform according to the present embodiment and a method for manufacturing an optical fiber using an optical fiber preform manufactured by this method have been described above. However, the present invention is not limited thereto and a variety of modifications can be applied. For example, in the addition step S2 in the above method for manufacturing an optical fiber preform, the glass pipe 31 is heated by the heating burner 34 with only both ends thereof supported. However, in order to further suppress deformation of the glass pipe 31, for example, as illustrated in FIG. 6A and FIG. 6B, two rotatable support rollers 35 having an axis parallel to the axis of the glass pipe 31 may be provided under the glass pipe 31 to support the glass pipe 31. In this case, deformation of the glass pipe 31 by heat can be further suppressed. In this case, the rotatable support rollers 35 may be disposed immediately outside of the range in which the heating burner is traversed, or the rotatable support rollers 35 may be disposed at a certain distance from the heating burner, and the rotatable support rollers 35 and the heating burner may be traversed simultaneously.

REFERENCE SIGNS LIST

1 . . . optical fiber preform, 10 . . . core part, 11 . . . first core part, 12 . . . second core part, 20 . . . cladding part, 21 . . . first cladding part, 22 . . . second cladding part, 31 . . . glass pipe, 32 . . . external heat source, 33 . . . alkali metal material, 34 . . . heating burner, 35 . . . rotatable support roller, D . . . width.

The invention claimed is:

1. A method for manufacturing an optical fiber preform including a core part and a cladding part, comprising:
adding an alkali metal to an inner surface of a silica-based glass pipe;
etching the inner surface of the silica-based glass pipe to which the alkali metal is added;
making a glass rod by collapsing the silica-based glass pipe after the etching; and
making an optical fiber preform using the glass rod,
wherein the silica-based glass pipe is heated in the adding such that a surface temperature of the silica-based glass pipe falls within a temperature range of 1500° C. or higher to lower than 2000° C. while a space in which the silica-based glass pipe is held is kept at a positive pressure above atmospheric pressure of greater than 0 Pa and 20 Pa or less,
wherein the silica-based glass pipe is heated by reciprocatively traversing a heat source a plurality of times, the heat source being an oxyhydrogen burner,
wherein in the adding, a heating time per traverse of the reciprocatively traversing with which a surface temperature of a predetermined area of the silica-based glass pipe falls within the temperature range of 1500° C. or higher to lower than 2000° C. is 0.5 minute or longer and shorter than 40 minutes,
wherein the heating time is a time during which a certain point in the silica-based glass pipe is heated to 1500° C. or higher, and
wherein a traverse speed of the oxyhydrogen burner is 10 mm/min or greater and 165 mm/min or less.

2. The method for manufacturing an optical fiber preform according to claim 1, wherein in the adding, the heating time per traverse with which the surface temperature of the predetermined area of the silica-based glass pipe falls within the temperature range of 1500° C. or higher to lower than 2000° C. is 1 minute or longer and shorter than 40 minutes.

3. The method for manufacturing an optical fiber preform according to claim 1, wherein in the adding, the heating time per traverse with which the surface temperature of the predetermined area of the silica-based glass pipe falls within the temperature range of 1500° C. or higher to lower than 2000° C. is 0.5 minute or longer and shorter than 20 minutes.

4. The method for manufacturing an optical fiber preform according to claim 1,
wherein in the adding, the silica-based glass pipe is heated by the oxyhydrogen burner such that the surface temperature of the silica-based glass pipe falls within the temperature range of 1500° C. or higher to lower than 2000° C., and
a width that achieves a temperature zone of 1500° C. or higher in a heating temperature profile of the oxyhydrogen burner is kept to be not more than six times a diameter of the silica-based glass pipe.

5. The method for manufacturing an optical fiber preform according to claim 4, wherein in the adding, the silica-based glass pipe is heated such that the surface temperature of the silica-based glass pipe falls within a temperature range of 1500° C. or higher to lower than 1800° C.

6. The method for manufacturing an optical fiber preform according to claim 4,
wherein the alkali metal added in the adding is potassium, and
wherein the silica-based glass pipe is repeatedly heated in the adding such that the ratio d2/d1 in the optical fiber preform is 1.5 or more and less than 3.0 where d1 is the diameter of an area in which the potassium concentration in the optical fiber preform is 50 atomic ppm or more, and d2 is the diameter of an area in which the potassium concentration in the optical fiber preform is 50 atomic ppm or less and the chlorine concentration is 1000 atomic ppm or less.

7. The method for manufacturing an optical fiber preform according to claim 1, wherein in the adding, the silica-based glass pipe is heated such that the surface temperature of the silica-based glass pipe falls within a temperature range of 1500° C. or higher to lower than 1800° C.

8. The method for manufacturing an optical fiber preform according to claim 1,
wherein the alkali metal added in the adding is potassium, and wherein the silica-based glass pipe is repeatedly heated in the adding such that the ratio d2/d1 in the optical fiber preform is 1.5 or more and less than 3.0 where d1 is the diameter of an area in which the potassium concentration in the optical fiber preform is 50 atomic ppm or more, and d2 is the diameter of an area in which the potassium concentration in the optical fiber preform is 50 atomic ppm or less and the chlorine concentration is 1000 atomic ppm or less.

9. A method for manufacturing an optical fiber using an optical fiber preform including a core part and a cladding part, comprising:
 adding an alkali metal to an inner surface of a silica-based glass pipe;
 etching the inner surface of the silica-based glass pipe to which the alkali metal is added;
 making a glass rod by collapsing the silica-based glass pipe after the etching;
 making an optical fiber preform using the glass rod; and
 drawing the optical fiber preform to manufacture an optical fiber,
 wherein the silica-based glass pipe is heated by reciprocatively traversing a heat source a plurality of times, the heat source being an oxyhydrogen burner,
 wherein in the adding, a heating time per traverse of the reciprocatively traversing with which a surface temperature of a predetermined area of the silica-based glass pipe falls within the temperature range of 1500° C. or higher to lower than 2000° C. is 0.5 minute or longer and shorter than 40 minutes,
 wherein the heating time is a time during which a certain point in the silica-based glass pipe is heated to 1500° C. or higher,
 wherein a traverse speed of the oxyhydrogen burner is 10 mm/min or greater and 165 mm/min or less, and
 wherein in the adding, a space in which the silica-based glass pipe is held is kept at a positive pressure above atmospheric pressure of greater than 0 Pa and 20 Pa or less.

* * * * *